United States Patent [19]

Yoshikawa et al.

[11] Patent Number: 4,660,964

[45] Date of Patent: Apr. 28, 1987

[54] IMAGE RECORDING APPARATUS

[75] Inventors: Sumio Yoshikawa; Atsushi Shiraishi, both of Kanagawa, Japan

[73] Assignee: Fuji Photo Film Co., Ltd., Kanagawa, Japan

[21] Appl. No.: 884,342

[22] Filed: Jul. 11, 1986

[30] Foreign Application Priority Data

Jul. 12, 1985 [JP] Japan ................................ 60-153622

[51] Int. Cl.[4] ............................................... G03B 29/00

[52] U.S. Cl. .................................. 355/28; 355/3 TR; 355/3 DR; 219/216; 346/25; 250/317.1

[58] Field of Search .................. 355/3 DR, 3 TR, 28; 219/216; 346/25; 250/317.1

[56] References Cited

U.S. PATENT DOCUMENTS

| | | | |
|---|---|---|---|
| 3,751,156 | 8/1973 | Szostak et al. | 355/3 TR |
| 3,837,741 | 9/1974 | Spencer | 355/3 TR |
| 4,482,240 | 11/1984 | Kuge et al. | 355/3 TR |
| 4,550,999 | 11/1985 | Anderson | 355/3 TR |

*Primary Examiner*—Monroe H. Hayes

*Attorney, Agent, or Firm*—Sughrue, Mion, Zinn, Macpeak, and Seas

[57] ABSTRACT

An image recording apparatus forms an image on a thermal developing photosensitive material by light exposure, develops thermally the image on the photosensitive material and transfers the developed image to an image-receiving paper so as to be recorded thereon. An exposing drum has a through-hole for holding the thermal developing photosensitive material thereon by suction. An exposing head for exposing the thermal developing photosensitive material is disposed in opposing relation to the outer periphery of the exposing drum, together with transfer rollers for transferring the thermally developed image to the image-receiving paper. In addition, a heater for thermal development is incorporated in the exposing drum. Accordingly, it is possible to carry out exposing, thermal developing and transfer operations while keeping the thermal developing photosensitive material wound on the outer periphery of the exposing drum.

23 Claims, 13 Drawing Figures

(A)

(B)

(C)

(D)

(E)

IMAGE RECORDING APPARATUS

BACKGROUND OF THE INVENTION

1. Field of the Invention

The present invention relates to an image recording apparatus which develops thermally an image formed on a thermal developing photosensitive material by light exposure and then transfers the developed image to an image-receiving paper so as to be recorded thereon.

2. Description of the Related Art

One type of conventional image recording apparatus has heretofore been arranged such that an image is formed on a thermal developing photosensitive material by light exposure, and after the image has been developed thermally, it is transferred to an image-receiving paper so as to be recorded thereon, as shown in Japanese Patent Laid-Open No. 75247/1984.

The operation of such conventional image recording apparatus is conducted as follows. A thermal developing photosensitive material is disposed in an exposing section and subjected to light exposure. The photosensitive material is then transported to a thermal developing device by a transporting means, and the photosensitive material which has been developed thermally in the developing device is further led to a transfer device by a feed means. In the transfer device, the photosensitive material is brought into close contact with an image-receiving paper, and the developed image is thereby transferred to the image-receiving paper.

Accordingly, it is necessary, in the conventional image recording apparatus, to successively dispose the developing device, the image-receiving paper feed means, the transfer device, etc. on the downstream side of the exposing section, which means that the size of the apparatus as a whole increases disadvantageously.

SUMMARY OF THE INVENTION

In view of the above-described circumstances, it is a primary object of the present invention to provide an image recording apparatus employing a thermal developing photosensitive material, which is so designed that it is possible to reduce the entire size thereof by a large margin.

To this end, the present invention provides an image recording apparatus which comprises: an exposing drum retaining a thermal developing photosensitive material which is wound on the outer periphery thereof; an exposing head disposed so as to face the outer periphery of the exposing drum and adapted to form an image on the thermal developing photosensitive material on the outer peripheray of the exposing drum by means of light exposure; thermal developing means for thermally developing the exposed photosensitive material which is still wound on the outer periphery of the exposing drum; image-receiving paper feed-means for feeding an image-receiving paper onto the thermal developing photosensitive material wound on the outer periphery of the exposing drum; and transfer means adapted to press both the thermal developing photosensitive material and the image-receiving paper against the outer periphery of the exposing drum, thereby transferring the image formed on the thermal developing photosensitive material to the image-receiving paper.

By virtue of the above-described arrangement, after the thermal developing photosensitive material has been wound on the outer periphery of the exposing drum, an image is formed on the photosensitive material by the exposing head, and the photosensitive material which is still on the outer periphery of the exposing drum is thermally developed by the thermal developing means. After the development, an image-receiving paper is supplied onto the thermal developing photosensitive material from the image-receiving paper feed means, and the image on the photosensitive material is transferred to the image-receiving paper by the transfer means. Thus, exposing, thermal developing and transfer operations are effected on the thermal developing photosensitive material which is wound on the outer periphery of the exposing drum and held in this state throughout the recording process. It is therefore possible to reduce the overall size of the apparatus by a large margin.

DESCRIPTION OF THE PREFERRED EMBODIMENTS

Figure 1:
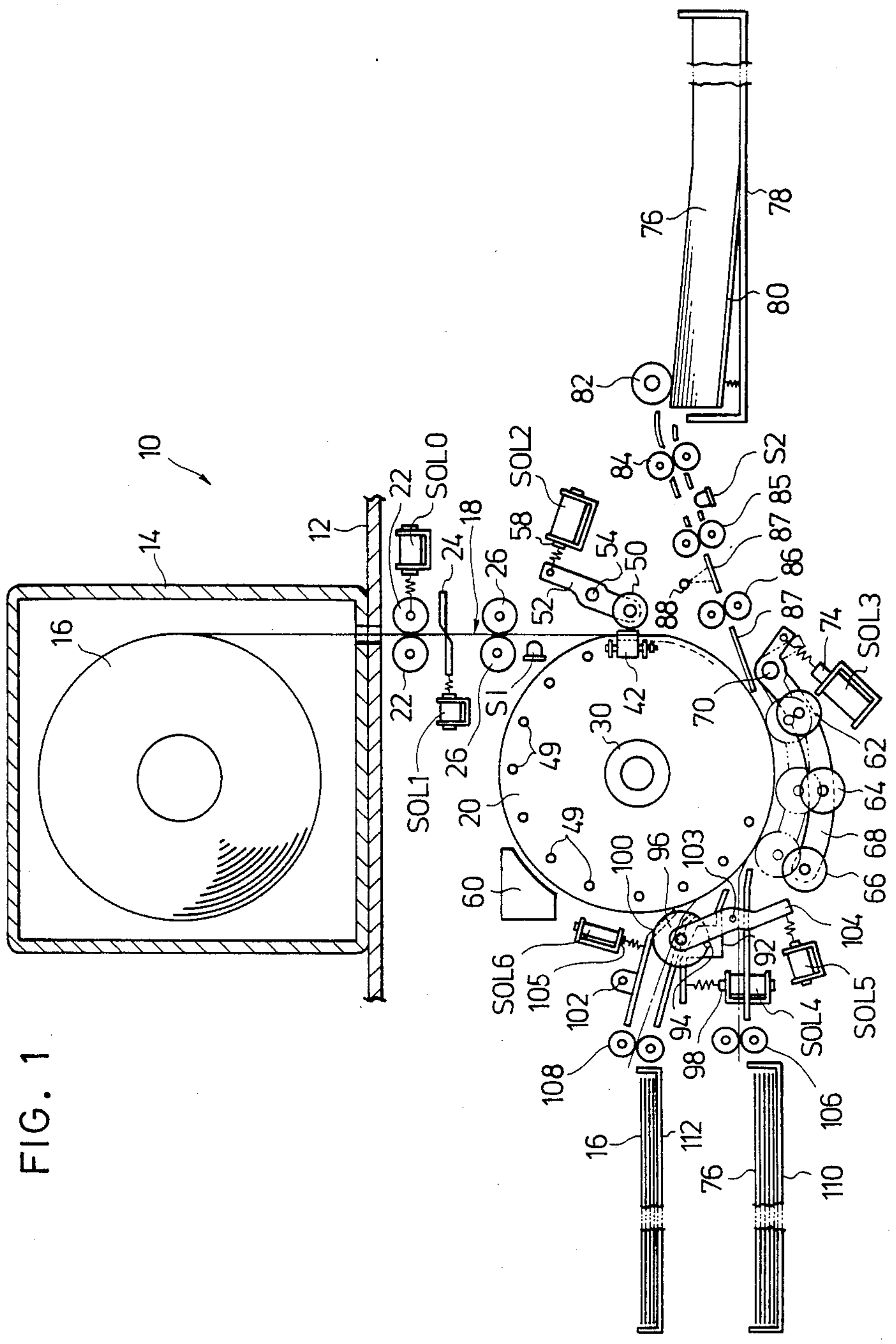
FIG. 1 is a sectional view of a first embodiment of the image recording apparatus according to the present invention.

FIG. 1 shows an image recording apparatus 10 in accordance with a first embodiment of the present invention.

In this image recording apparatus 10, a magazine 14 can be mounted on a machine frame 12, the magazine 14 accommodating a thermal developing photosensitive material 16 wound in the shape of a roll.

The photosensitive material 16 is unwound through a guide path 18 in a direction tangential to an exposing drum 20.

Along the guide path 18 are disposed the following members. Namely, a pair of feed rollers 22 are disposed directly below the magazine 14 in such a manner that the thermal developing photosensitive material 16 drawn out of the magazine 14 can be fed along the guide path 18. A cutter 24 is disposed directly below the feed rollers 22, the cutter 24 being adapted to be actuated by the operation of a solenoid SOL1. A pair of feed rollers 26 and a sensor S1 which is able to detect the passage of the photosensitive material 16 are disposed on the downstream side of the cutter 24 with respect to the direction in which the photosensitive material 16 is transported.

Figure 2:
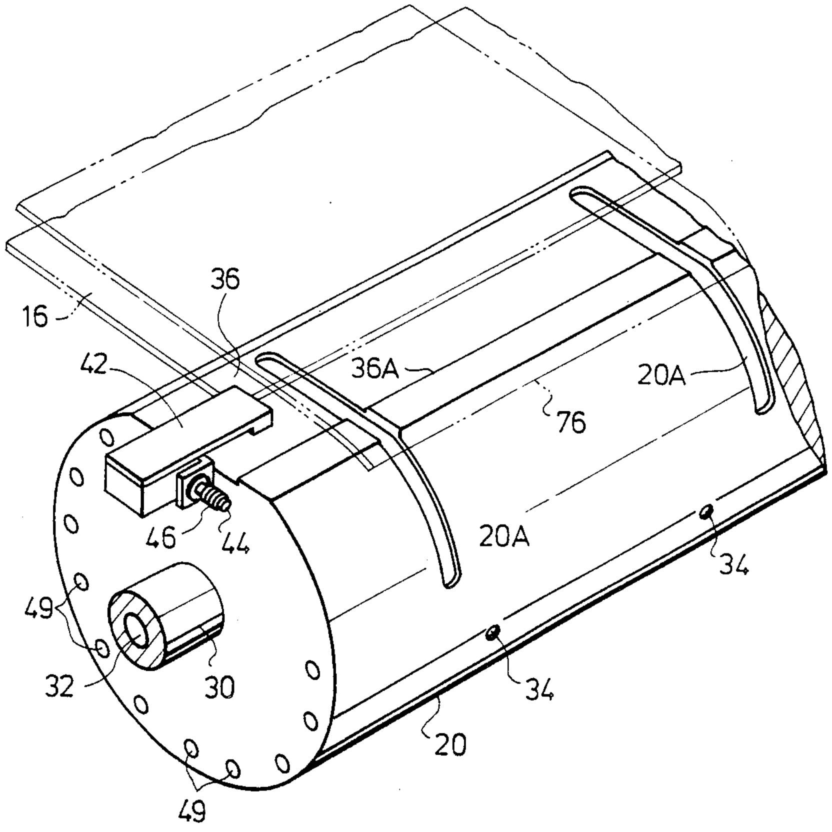
FIG. 2 is a perspective view of an exposing drum employed in the embodiment illustrated in FIG. 1.

Referring next to FIG. 2, the exposing drum 20 has a support shaft 30 projecting from the axial center thereof. The support shaft 30 is rotatably supported by a bearing device (not shown), thereby allowing the exposing drum 20 to be rotatable. A bore 32 with a circular cross-section is provided in the support shaft 30 in such a manner as to extend through the axial center thereof. The bore 32 is communicated with a vacuum suction means (not shown), so that the inside of the exposing drum 20 can be evacuated. Thus, the thermal developing photosensitive material 16 which is wound on the outer periphery of the exposing drum 20 can be held in this state by suction effected through a plurality of through-holes 34 provided in the exposing drum 20 at appropriate positions on the outer periphery thereof.

A part of the outer periphery of the exposing drum 20 is cut in a direction tangential thereto to form a cut portion 36 which is employed to retain the leading end portion of the thermal developing photosensitive material 16. The leading end of the photosensitive material 16 is allowed to abut against a step 36A and thereby set in position, and both lateral edge portions of the photosensitive material 16 are secured to the surface of the cut portion 36 by the clamping action of respective clips 42. Each of the clips 42 is pivotally supported at the intermediate portion thereof by the exposing drum 20 through a pin 44, and is biased by means of a torsion coil spring 46 so that the distal end portion presses the thermal developing photosensitive material 16 against the surface of the cut portion 36, thereby holding the leading end portion of the photosensitive material 16 on the outer periphery of the exposing drum 20.

In addition, heater elements 49 are buried in the exposing drum 20, so that the photosensitive material 16 wound on the outer periphery of the exposing drum 20 can be developed thermally.

As will be clear from FIG. 1, when the thermal developing photosensitive material 16 is being fed to the exposing drum 20, the drum 20 is at rest in the position illustrated in FIG. 1 in which the cut portion 36 faces the guide path 18. In this state, a clip canceling roller 50 abuts against each clip 42, thus causing the distal end portion of the clip 42 to be separated slightly from the surface of the cut portion 36. This clip canceling roller 50 is rotatably supported at the distal end of an arm 52 which is in turn pivotally supported by the machine frame 12 through a pin 54. The end portion of the arm 52 which is opposite to the clip canceling roller 50 is connected to an actuator 58 of a solenoid SOL2.

Accordingly, when the solenoid SOL2 is activated, the arm 52 pivots about the pin 54, and the clip canceling roller 50 abuts against the clip 42, causing the distal end portion of the clip 42 to be separated slightly from the surface of the cut portion 36, and thus allowing the leading end portion of the thermal developing photosensitive material 16 fed out along the guide path 18 to be inserted into the area between the clip 42 and the surface of the cut portion 36. When the exciting force of the solenoid SOL2 is canceled thereafter, the clip 42, which is subjected to the biasing force from the torsion coil spring 46, is allowed to abut against the surface of the cut portion 36, thereby enabling the thermal developing photosensitive material 16 to be clamped.

An exposing head 60 is, as shown in FIG. 1, is disposed in the close proximity with the outer periphery of the exposing drum 20, so that, when the exposing drum 20 is rotated, the thermal developing photosensitive material 16 wound on the outer periphery of the exposing drum 20 can be exposed by the exposing head 60. The exposing head 60 is adapted to be movable so as to scan across the outer periphery of the exposing drum 20 in the axial direction of the drum 20, whereby an image can be formed on the surface of the photosensitive material 16 by means of light exposure.

Transfer rollers 62, 64 and 66 are provided on the outer periphery of the exposing drum 20. These transfer rollers 62, 64 and 66 are individually rotatably supported by the intermediate portion of a transfer arm 68. This transfer arm 68 is pivotally supported by the machine frame 12 through a pin 70. One end portion of the transfer arm 68 is connected to an actuator 74 of a solenoid SOL3, so that the transfer arm 68 approaches the outer periphery of the exposing drum 20 so as to permit a transfer operation to be effected only when the solenoid SOL3 is activated.

The transfer rollers 62, 64 and 66 are, for example, heating rollers each incorporating a heater. Thus, when an image-receiving paper 76 is brought into close contact with the thermal developing photosensitive material 16 wound on the outer periphery of the exposing drum 20 and while the image receiving paper 76 and the photosensitive material 16 are transported from the transfer roller 62 to the transfer roller 66, they are heated by the transfer rollers 62, 64 and 66, thereby allowing the image on the photosensitive material 16 to be transferred to the image-receiving paper 76.

A plurality of sheets of image-receiving paper 76 are accommodated in a tray 80 in advance, and the uppermost one of the accommodated sheets of image-receiving paper 76 is supplied to the outer periphery of the exposing drum 20 by the action of a one-way roller 82. For this purpose, pairs of feed rollers 84, 85 and 86 are provided adjacent to the roller 82, together with guide plates 87 for guiding the image-receiving paper 76 between these rollers and to the outer periphery of the exposing drum 20.

In addition, a sensor S2 for detecting the passage of the image-receiving paper 76 is provided between the pairs of feed rollers 84 and 85, and a spray nozzle 88 is provided between the pairs of feed rollers 85 and 86, the spray nozzle 88 being adapted to spray the image-receiving paper 76 with water as an image forming solvent for the purpose of improving the transfer efficiency. It should be noted that it is not always necessary to carry out application of an image forming solvent by means of the spray nozzle 88, and the spray nozzle 88 is omitted when employing a photosensitive material or an image-receiving paper of the type in which an image forming solvent is incorporated in advance.

As shown in FIG. 2, the width of the image-receiving paper 76 is made smaller than that of the thermal developing photosensitive material 16 so that the image-receiving paper 76 is not affected by the action of the clips 42. The image-receiving paper 76 is wound up on the outer periphery of the exposing drum 20 in such a manner that the leading end thereof projects beyond the leading end of the photosensitive material 16.

Figure 4:
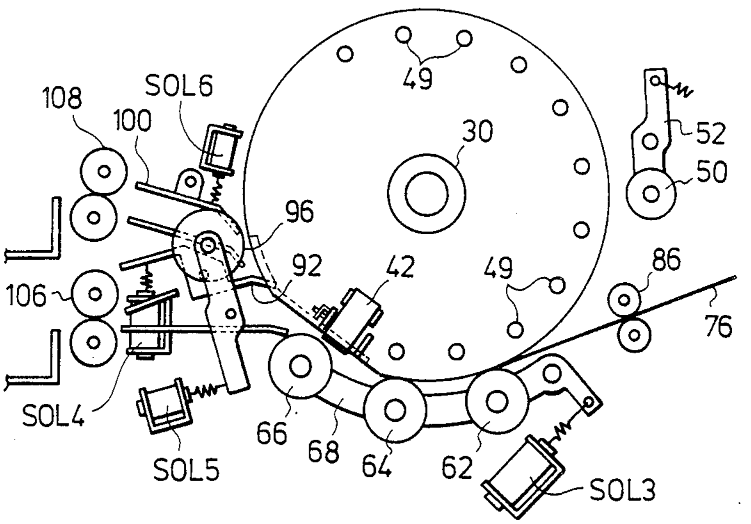
FIGS. 4 and 5 are sectional views showing the operation of the essential part illustrated in FIG. 3.

An image-receiving paper separating arm 92 is disposed between the transfer roller 66 and the exposing head 60. The arm 92 is pivotally supported at the intermediate portion thereof by the machine frame 12 through a pin 94. One end of the arm 92 is connected to an actuator 98 of a solenoid SOL4 so that, when the solenoid SOL4 is activated, the other end of the arm 92 enters one of the grooves 20A (see FIG. 2) formed in the outer periphery of the exposing drum 20 as shown in FIG. 4, thereby allowing the leading end of the image-receiving paper 76 to be separated from the outer periphery of the exposing drum 20 as the drum 20 is rotated clockwise as viewed in FIG. 1.

Figure 5:
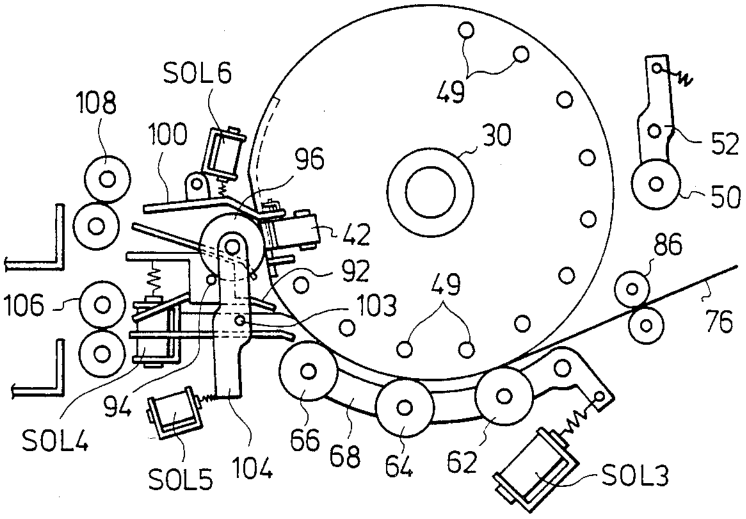

Further, a photosensitive material separating arm 100 is provided between the image-receiving paper separating arm 92 and the exposing head 60, and is pivotally supported by the machine fram 12 through a pin 102. The arm 100 is arranged such that, when it is pivoted by an actuator 105 of a solenoid SOL6, the distal end portion of the arm 100 enters one of the grooves 20A provided in the outer periphery of the exposing drum 20 as shown in FIG. 5, thus allowing the thermal developing photosensitive material 16 to be separated from the outer periphery of the exposing drum 20 as the drum 20 is rotated clockwise as viewed in FIG. 1.

When the photosensitive material 16 is separated by the action of the arm 100, it is necessary to cancel the clamping of the photosensitive material 16 by means of the clips 42. For this reason, a clip cancelling roller 96 is provided for each of the clips 42. The roller 96 is rotatably mounted at the distal end of a clip canceling arm 104 which is pivotally supported by the machine frame 12 through a pin 103. This arm 104 is pivoted by the driving force applied thereto from a solenoid SOL5 in such a manner that the arm 104 is able to press one end of the clip 42.

Trays 110 and 112 are disposed in such a manner as to oppose the thermal developing photosensitive material 16 and the image-receiving paper 76, respectively, which are separated from the outer periphery of the exposing drum 20 so that the trays 110 and 112 respectively accommodate the photosensitive material 16 and the image-receiving paper 76.

Figure 6:
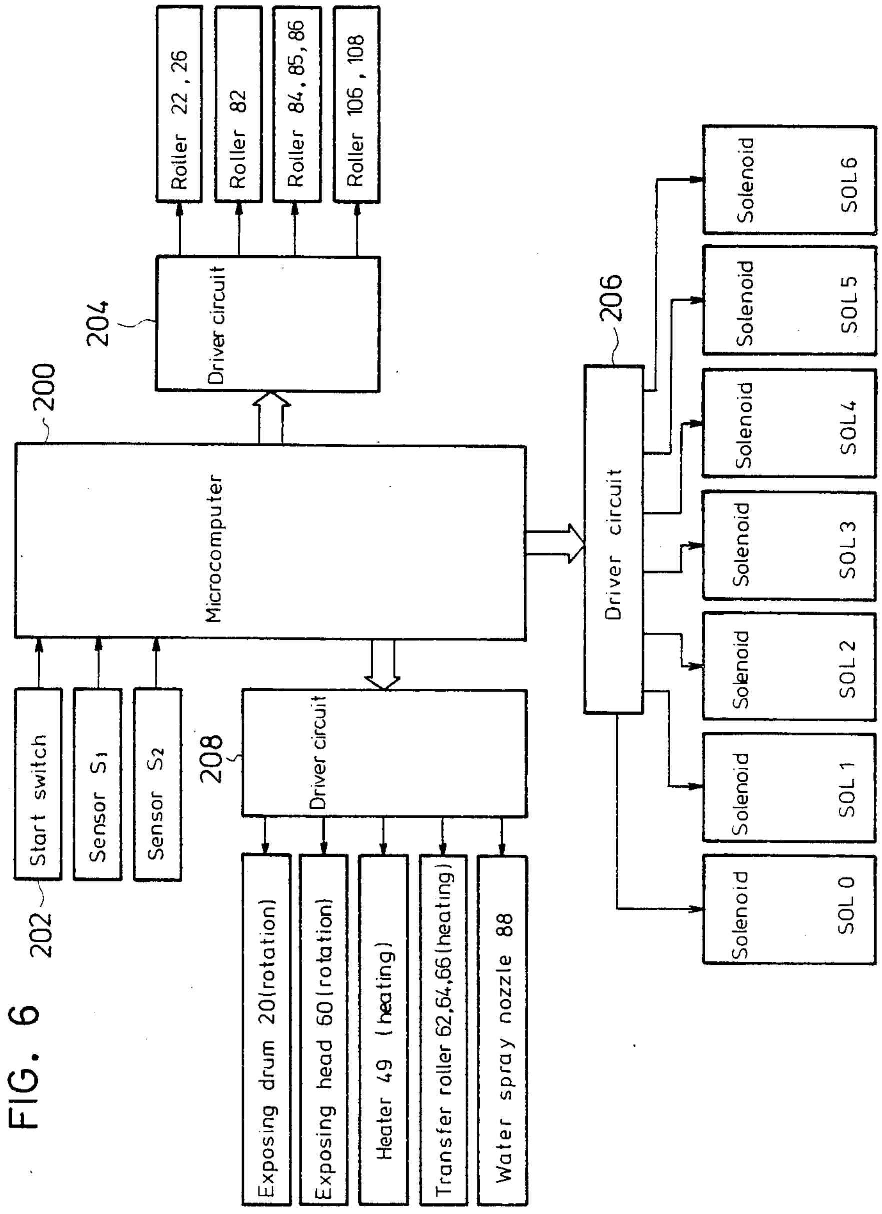
FIG. 6 shows a control circuit employed in the embodiment illustrated in FIG. 1.

The apparatus arranged as detailed above is controlled by a microcomputer 200 which serves as a central processing unit as shown in FIG. 6. The microcomputer 200 is adapted to start control on receipt of a start signal delivered from a start switch 202, and is supplied with signals respectively delivered from the sensors $S_1$ and $S_2$.

The microcomputer 200 activates various rollers to rotate through a driver circuit 204 and excites various solenoids through a driver circuit 206. The microcomputer 200 further effects control, through a driver circuit 208, of the rotation of the exposing drum 20, the scanning exposure effected by the exposing head 60, the energization of the heater elements 49, the energization of the transfer rollers 62, 64, 66 for heating, and the operation of the water spray nozzle 88.

Figure 7:
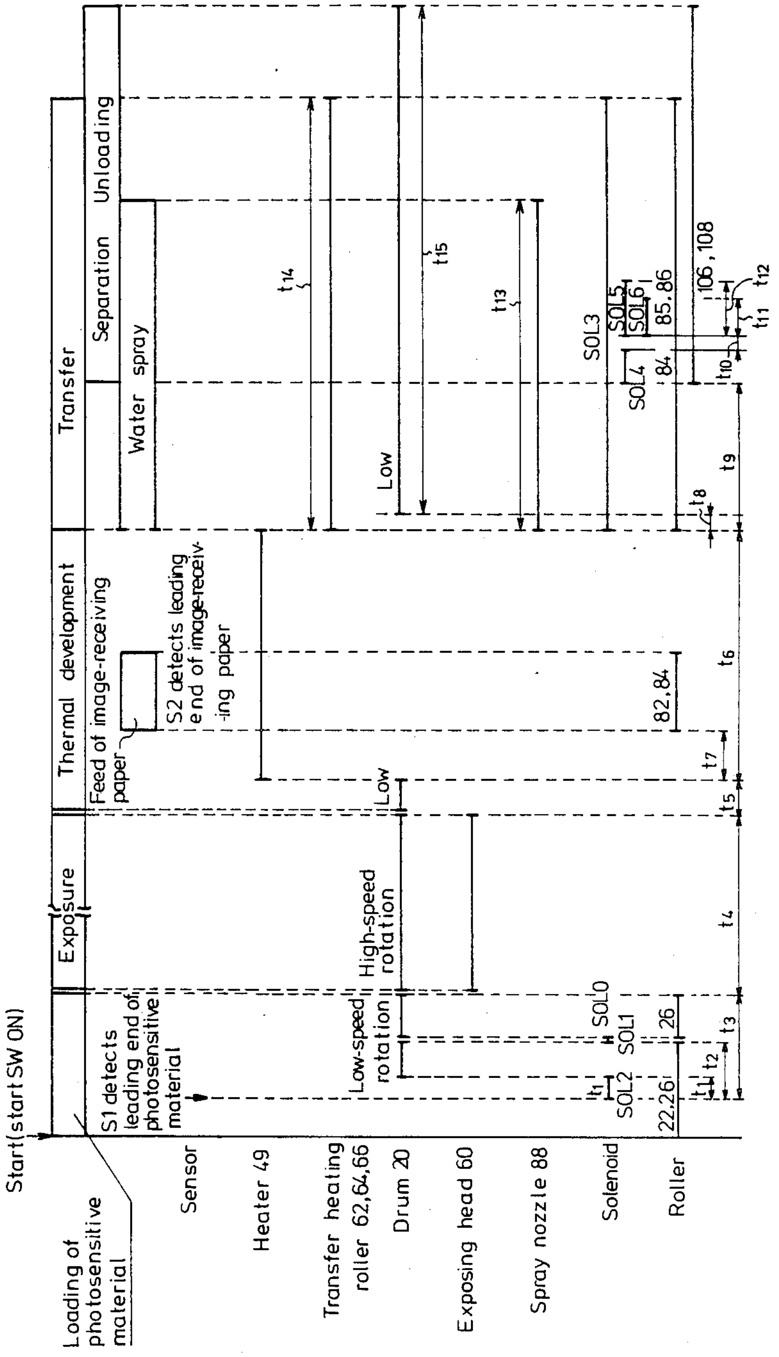
FIG. 7 is a time chart showing the operation of the embodiment illustrated in FIG. 1.
Figure 8:
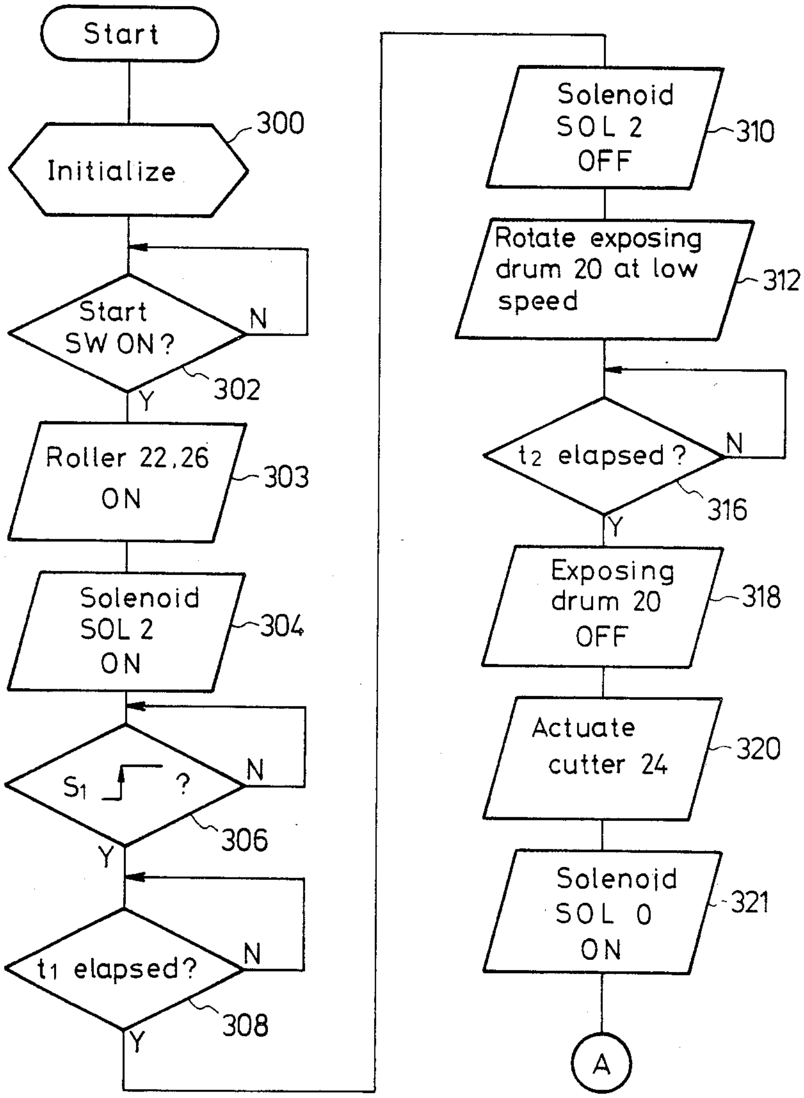
FIGS. 8 (8A–8E) is a control flowchart showing the operation of the embodiment illustrated in FIG. 1.
Figure 8:
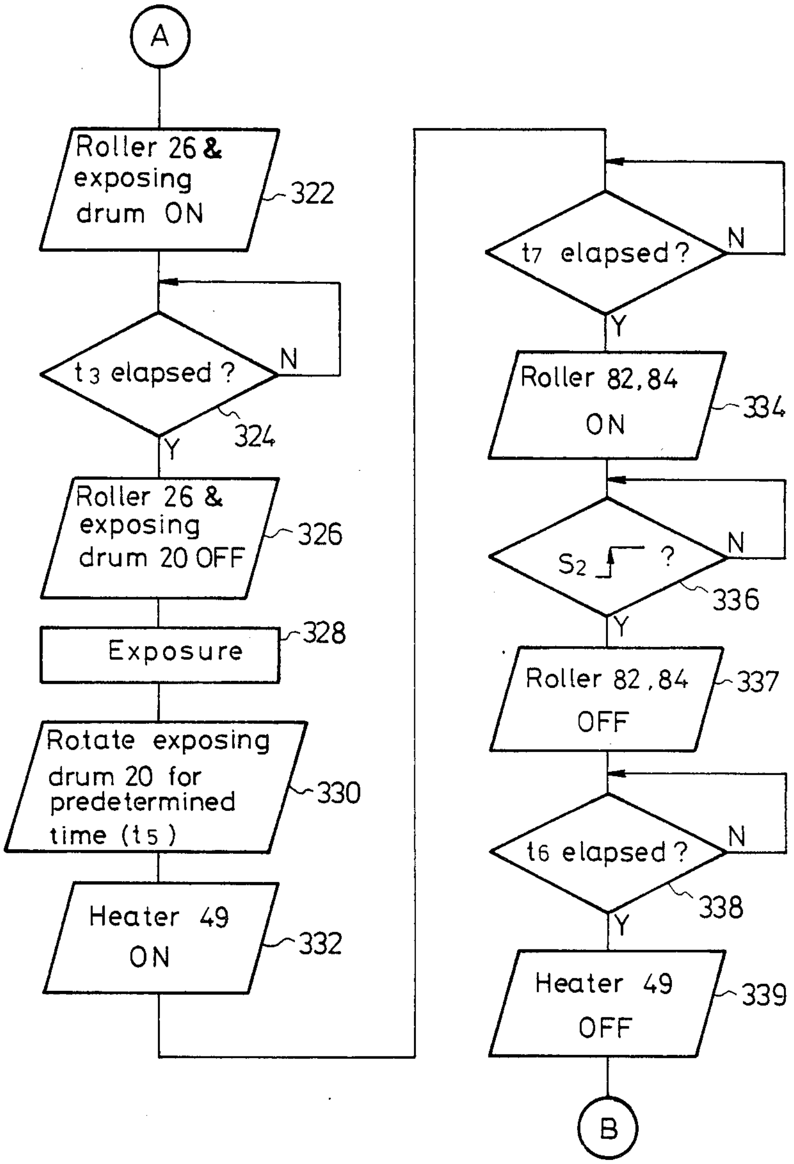
Figure 8:
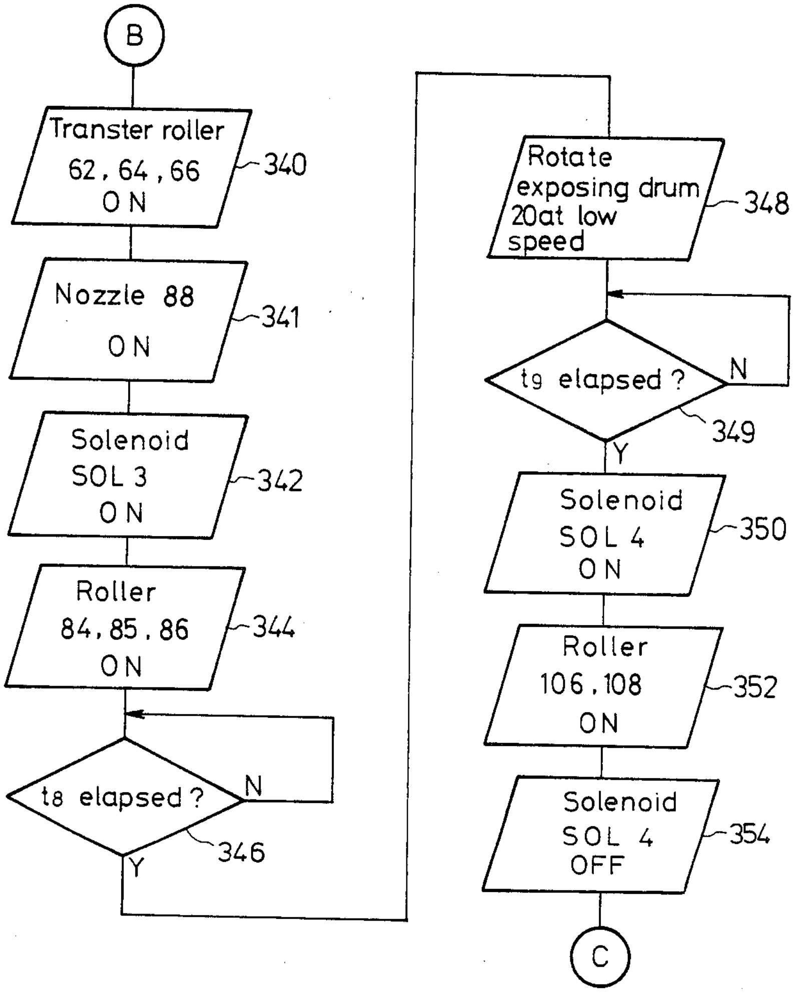
Figure 8:
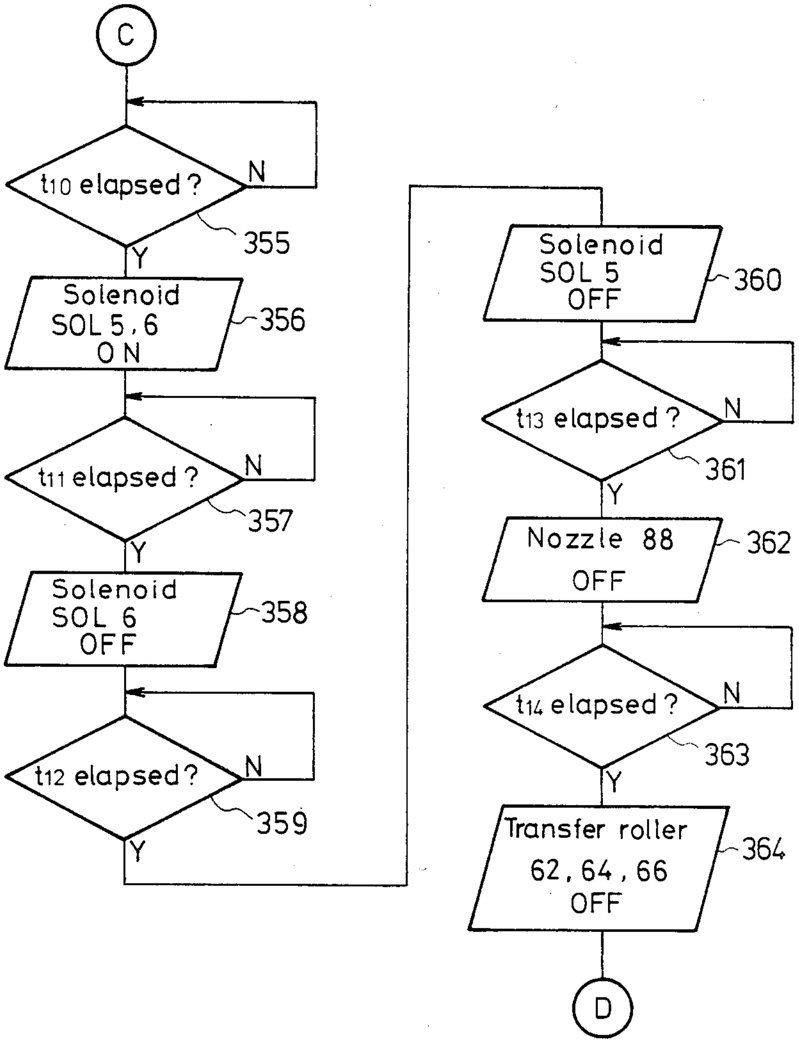
Figure 8:
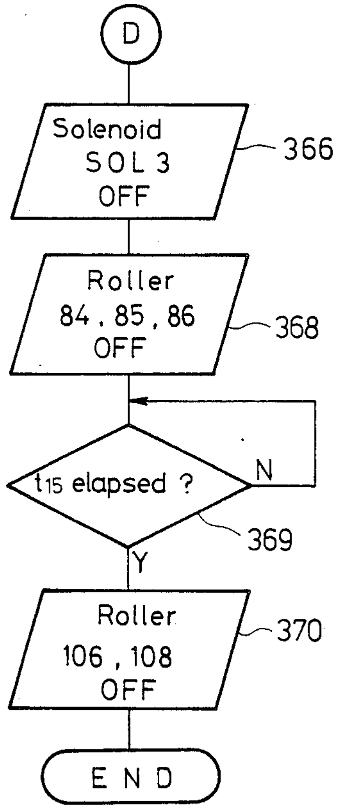

The operation of this embodiment, arranged as described above, will be explained below with reference to a time chart shown in FIG. 7 and in accordance with a flowchart shown in FIG. 8.

In Step 300, the work area of the RAM incorporated in the microcomputer 20 is initialized, and various output signals are also initialized. When the start switch 202 is turned ON (Step 302), the pairs of drive rollers 22 and 26 are activated to rotate (Step 303). In consequence, the thermal developing photosensitive material 16 is pulled out of the magazine 14 and transported toward the clip 42 which is at rest in a state such as that shown in FIG. 1. Then, the solenoid SOL2 is activated (Step 304), so that the clip 42 is pivoted by the action of the roller 50 so as to separate from the surface of the cut portion 36, thereby providing a space for insertion of the thermal developing photosensitive material 16.

When the pulse signal from the sensor $S_1$ rises, that is, when the leading end of the thermal developing photosensitive material 16 is detected (Step 306), the process proceeds to Step 308. When a predetermined period of time $t_1$ has elapsed (Step 308), the solenoid SOL2 is deenergized (Step 310). The time $t_1$ is set such as to correspond to a period of time which starts at the time when the leading end of the photosensitive material 16 is detected and which ends at the time when said leading end abuts against the the step 36A of the cut portion 36. At the same time as the solenoid SOL2 is de-energized, the exposing drum 20 is started to rotate at relatively low speed (Step 312). In consequence, the clip 42 is rotated together with the drum 20 while clamping the thermal developing photosensitive material 16 between the same and the surface of the cut portion 36 by means of the biasing force from the spring 46, thus causing the photosensitive material 16 to be wound on the outer periphery of the exposing drum 20. For this purpose, the respective peripheral speeds of the drive rollers 22, 26 and the exposing drum 20 are set such as to be equal to each other.

Then, a judgement is made (Step 316) as to whether or not a period of time $t_2$ has elapsed after the sensor $S_1$ had detected the leading end of the photosensitive material 16. If YES, the rotation of the exposing drum 20 is suspended (Step 318), and the solenoid SOL1 is momentarily activated to actuate the cutter 24 to cut the thermal developing photosensitive material 16 (Step 320). The period of time $t_2$ is set such as to be equal to a period of time which is required for a necessary length of the photosensitive materia 16 to be wound on the outer periphery of the exposing drum 20.

Then, the solenoid SOL0 is activated to cancel the nipping by the pair of rollers 22 (Step 321), and the pair of rollers 26 and the exposing drum 20 are started to rotate at relatively low speed again (Step 322). After a period of time $t_3$ has elapsed (Step 324), the rotation of the rollers 26 and the exposing drum 20 is suspended (Step 326). Thus, the whole of the piece of photosensitive material 16 which is cut off at the position of the cutter 24 is wound up on the outer periphery of the exposing drum 20.

Then, the exposing drum 20 is rotated at relatively high speed, and the exposing head 60 is activated to form an image on the thermal developing photosensitive material 16 by means of light exposure. After an exposing time $t_4$ has elapsed, the operation of the exposing head 60 is suspended to end the exposing operation (Step 328). Thereafter, the exposing drum 20 is rotated at relatively low speed for a predetermined period of time $t_5$ and stopped at the position illustrated in FIG. 3 (Step 330).

Then, the heater elements 49 incorporated in the exposing drum 20 are turned ON to start thermal development (Step 332). When a predetermined period of time $t_7$ has elapsed after the starting of thermal development (Step 333), the rollers 82 and 84 are started to rotated, and the image-receiving paper 76 is thereby fed out to the outer periphery of the exposing drum 20 (Step 334). When the leading end of the image-receiving paper 76 reaches the sensor $S_2$ (Step 336), he rotation of the rollers 82 and 84 is suspended (Step 337), and the image-receiving paper 76 stands by with the leading end thereof separated from the outer periphery of the exposing drum 20. After a period of time $t_6$ has elapsed (Step 338), the heater elements 49 are turned OFF to end the thermal development (Step 339).

Then, the transfer rollers 62, 64 and 66 are started to generate heat (Step 340), and the spray nozzle 88 is activated to spray water on the image-receiving paper 76 (Step 341). In addition, the solenoid SOL3 is turned ON to bring the transfer rollers 62, 64 and 66 into contact with the outer periphery of the exposing drum 20 (Step 342), and the pairs of rollers 84, 85 and 86 are activated to rotate (Step 344), whereby a transfer operation is started. In consequence, the leading end of the image-receiving paper 76 moves in a direction in which it is inserted into the area between the roller 62 and the outer periphery of the exposing drum 20.

When a period of time $t_8$ has elapsed after the starting of rotation of the rollers 84, 85 and 86 (Step 346), the leading end of the image-receiving paper 76 reaches the area between the outer periphery of the exposing drum 20 and the transfer roller 62, and the exposing drum 20 is therefore started to rotate at relatively low speed (Step 348).

Figure 3:
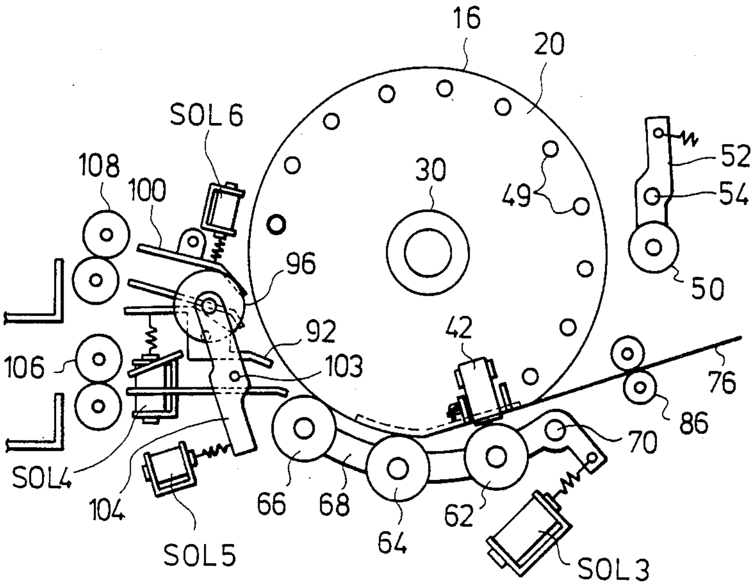
FIG. 3 is a sectional view of an essential part of the embodiment illustrated in FIG. 1, which shows the operation thereof.

In consequence, the image-receiving paper 76 is, as shown in FIGS. 2 and 3, tightly wound on the thermal developing photosensitive material 16, and while doing so, the image on the photosensitive material 6 is transferred to the image-receiving paper 76.

The exposing drum 20 is continuously rotated at relatively low speed, and when a period of time $t_9$ has elapsed, that is, when the leading end of the image-receiving paper 76 reaches a position which opposes the image-receiving paper separating arm 92 (Step 349), the solenoid SOL4 is activated (Step 350), and the distal end of the arm 92 consequently enters the groove 20A as shown in FIG. 4. At the same time, pairs of rollers 106 and 108 are activated to rotate (Step 352), so that separation and unloading of the leading end portion of the image-receiving paper 76 are started in parallel to the transfer operation effected on the trailing end portion of the paper 76. Accordingly, the leading end portion of the image-receiving paper 76 separated by the arm 92 is fed into the tray 110 by the action of the pair of rollers 106. At this time, the solenoid SOL4 is turned OFF (Step 354). However, since the leading end portion of the image-receiving paper 76 has already been separated from the outer periphery of the exposing drum 20, no probelm occurs, and there is no fear of the leading end portion of the thermal developing photosensitive material 16 being undesirably separated, said leading end being transported while delaying with respect to the leading end of the image-receiving paper 76.

When a period of time $t_{10}$ has elapsed (Step 355), both the solenoids SOL5 and SOL6 are turned ON (Step 356). In consequence, the clip canceling roller 96 abuts against the clip 42 which rotates together with the exposing drum 20, thus releasing the leading end portion of the thermal developing photosensitive material 16, as shown in FIG. 5. In addition, the photosensitive material separating arm 100 enters the groove 20A, so that the released leading end portion of the photosensitive material 16 is separated from the outer periphery of the exposing drum 20 and fed into the tray 112 by the action of the pair of rollers 108. Thus, separation and unloading of the thermal developing photosensitive material 16 are started.

When a period of time $t_{11}$ has elapsed (Step 357), the photosensitive material separating arm 100 is returned (Step 358), and when a period of time $t_{12}$ has elapsed (Step 359), the solenoid SOL5 is turned OFF (Step 360). In consequence, the roller 96 comes in contact with the outer periphery of the exposing drum 20. However, since the leading end portion of the thermal developing photosensitive material 16 has already been separated, no probelm occurs.

In this way, water spray, transfer, separation and loading into the tray 110 sequentially progress from the leading end toward the trailing end of the image-receiving paper 76. As to the thermal developing photosensitive material 16 also, transfer, separation and loading into the tray 112 sequentially progress from the leading end toward the trailing end thereof.

When a period of time $t_{13}$ has elapsed, that is, when the trailing end of the image-receiving paper 76 has passed the position of the spray nozzle 88 (Step 361), the spray nozzle 88 is turned OFF (Step 362) to end the water spray operation.

When the trailing end of the image-receiving paper 76 has passed the transfer rollers 62, 64 and 66, that is, a period of time $t_{14}$ has elapsed (Step 363), the energization of the transfer rollers 62, 64 and 66 is cut OFF (Step 364). At the same time, the solenoid SOL3 is turned OFF (Step 366), so that the transfer rollers 62, 64 and 66 are separated from the outer periphery of the exposing drum 20, and the rotation of the feed rollers 84, 85 and 86 is suspended (Step 368) to end the transfer operation.

Thus, the image-receiving paper 76 and the thermal developing photosensitive material 16 are respectively fed into the trays 110 and 112, and when their respective trailing ends have completely been accommodated therein, that is, when a period of time $t_{15}$ has elapsed (Step 369), the rotation of the rollers 106 and 108 is suspended to end the unloading operation (Step 370).

In this way, the exposing, developing and transfer operations for one image are completed.

Thus, the image-receiving paper 76 having an image transferred thereto can be taken out of the tray 110, while the thermal developing photosensitive material 16 having been subjected to the transfer operation is deposited in the tray 112 and can readily be discarded.

Figure 9:
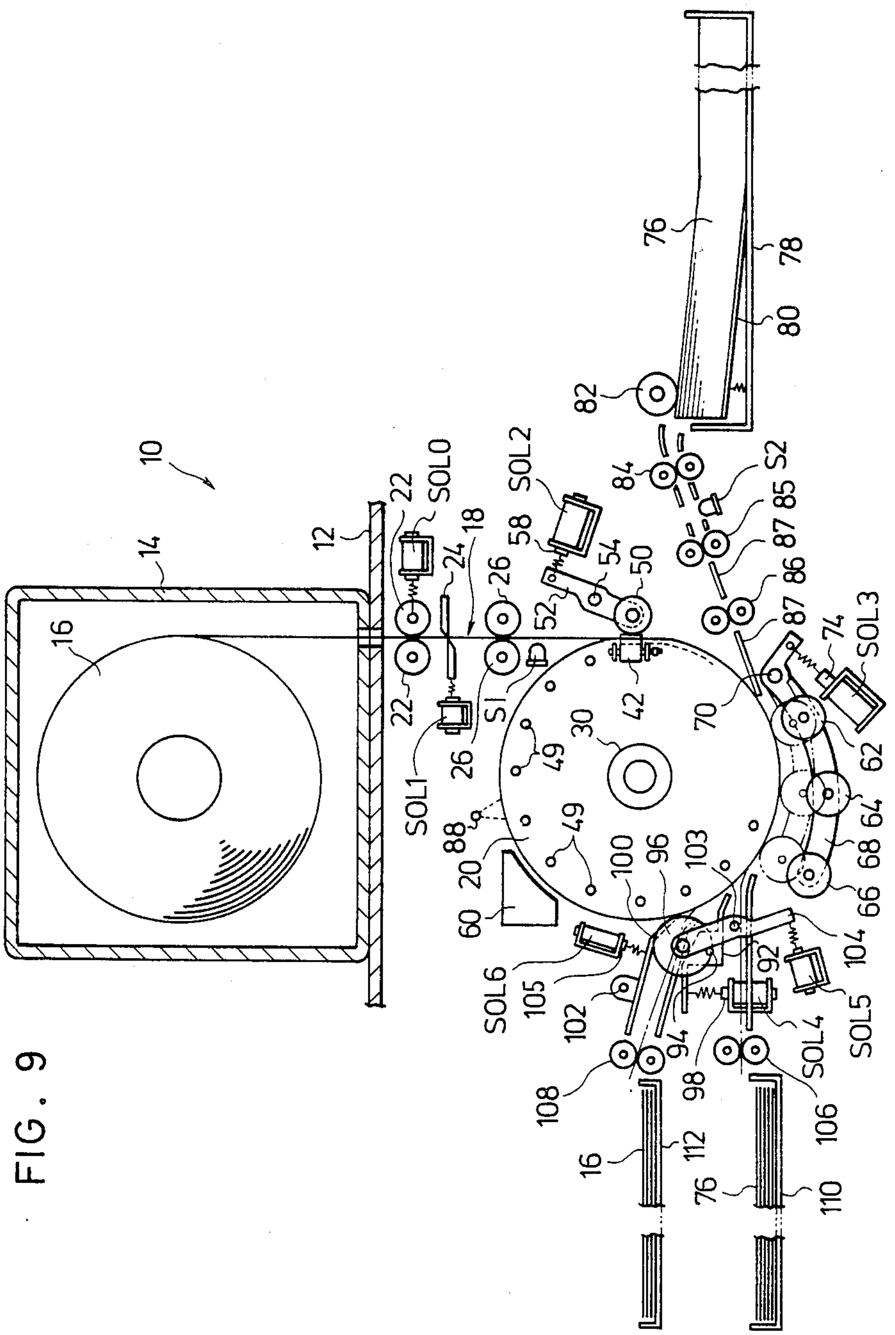
FIG. 9 shows a second embodiment of the present invention, which is a sectional view corresponding to FIG. 1.

FIG. 9 shows a second embodiment of the present invention. In this embodiment, the spray nozzle 88, which is provided between the pairs of feed rollers 85 and 86 in the first embodiment, is provided in opposing relation to the outer periphery of the exposing drum 20.

More specifically, the spray nozzle 88 in this embodiment is adapted to apply water to the image trasfer surface of the thermal developing photosensitive material 16 wound on the outer periphery of the exposing drum 20 after it has been developed thermally by means of the heater elements 49 for the purpose of improving the transfer efficiency.

The arrangement of the other portion of this embodiment is similar to that in the first embodiment, and it is therefore possible to obtain advantages similar to those offered by the first embodiment.

It should be noted that, although in the abovedescibed embodiments the development of the thermal developing photosensitive material 16 after light exposure is effected by the heater elements 49 incorporated in the exposing drum 20, the developing means may be disposed in opposing relation to the outer periphery of the exposing drum 20 so as to heat the photosensitive material 16 wound on the outer periphery of the exposing drum 20.

As has been described above, the image recording apparatus according to the present invention comprises: an exposing drum retaining a thermal developing photosensitive material wound on the outer periphery thereof; an exposing head disposed so as to face the outer periphery of the exposing drum and adapted to form an image on the thermal developing photosensitive material on the outer peripheray of the exposing drum by means of light exposure; thermal developing means for thermally developing the exposed photosensitive material which is still wound on the outer periphery of the exposing drum; image-receiving paper feed means for feeding an image-receiving paper onto the thermal developing photosensitive material wound on the outer periphery of the exposing drum; and transfer means adapted to press both the thermal developing photosensitive material and the image-receiving paper against the outer periphery of the exposing drum, thereby transferring the image formed on the thermal developing photosensitive material to the image-receiving paper. It is therefore possible to effect the exposing, thermal developing and transfer operations while keeping the thermal developing photosensitive material wound on the outer periphery of the exposing drum, so that the entire size of the image recording apparatus can be reduced by a large margin, advantageously.

What is claimed is:

1. An image recording apparatus which comprises:
(a) an exposing drum retaining a thermal developing photosensitive material wound on the outer periphery thereof;
(b) an exposing head disposed so as to face the outer periphery of said exposing drum and adapted to form an image on said thermal developing photosensitive material on the outer peripheray of said exposing drum by means of light exposure;
(c) thermal developing means for thermally developing said exposed photosensitive material which is still wound on the outer periphery of said exposing drum;
(d) image-receiving paper feed means for feeding an image-receiving paper onto said thermal developing photosensitive material wound on the outer periphery of said exposing drum; and
(e) transfer means adapted to press both said thermal developing photosensitive material and said image-receiving paper against the outer periphery of said exposing drum, thereby transferring the image formed on said thermal developing photosensitive material to said image-receiving paper,
whereby it is possible to effect exposing, developing and transfer operations while keeping said thermal developing photosensitive material wound on the outer periphery of said exposing drum.

2. An image recording apparatus according to claim 1, wherein said thermal developing means includes a heater incorporated in said exposing drum for heating said thermal developing photosensitive material wound thereon.

3. An image recording apparatus according to claim 2, wherein said transfer means is defined by a plurality of rollers which press both said image-receiving paper and said thermal developing photosensitive material against the outer periphery of said exposing drum.

4. An image recording apparatus according to claim 3, wherein said exposing drum has a through-hole provided in the outer peripheral portion thereof, said thermal developing photosensitive material being kept wound on the outer periphery of said exposing drum by suction effected through said through-hole.

5. An image recording apparatus according to claim 4, wherein said exposing drum has a cut portion formed by partially cutting the outer periphery thereof in a direction tangential thereto, and clips respectively secured to two lateral ends thereof, the leading end portion of said thermal developing photosensitive material being clamped between the surface of said cut portion and said clips.

6. An image recording apparatus according to claim 5, wherein said cut portion is provided with a step for positioning the leading end portion of said thermal developing photosensitive material.

7. An image recording apparatus according to claim 3, wherein said transfer means has drive means adapted to move said plurality of rollers in a direction in which they press both said image-receiving paper and said thermal developing photosensitive material against the outer periphery of said exposing drum only when transfer is effected.

8. An image recording apparatus according to claim 3, wherein said plurality of rollers are heating rollers each incorporating a heater.

9. An image recording apparatus according to claim 1, further comprising:
guide means for guiding said thermal developing photosensitive material to the outer periphery of said exposing drum, said photosensitive material being accommodated in a magazine while being wound in the shape of a roll.

10. An image recording apparatus according to claim 9, wherein said guide means has a pair of feed rollers which feed said thermal developing photosensitive material held therebetween, and a cutter for cutting said thermal developing photosensitive material into an appropriate length.

11. An image recording apparatus according to claim 1, wherein said image-receiving paper feed means includes an one-way roller for guiding said image-receiving paper to the outer periphery of said exposing drum.

12. An image recording apparatus according to claim 1, further comprising:
image-receiving paper separating means provided between said transfer means and said exposing head and adapted for separating said image-receiving paper from said exposing drum.

13. An image recording apparatus according to claim 12, wherein said image-receiving paper separating means includes an image-receiving paper separating arm adapted to enter a groove formed in the outer periphery of said exposing drum so as to separate the leading end of said image-receiving paper from the outer periphery of said exposing drum.

14. An image recording apparatus according to claim 1, further comprising:
photosensitive material separating means provided between said image-receiving paper separating arm and said exposing head and adapted for separating said thermal developing photosensitive material from said exposing drum.

15. An image recording apparatus according to claim 14, wherein said photosensitive material separating means includes a photosensitive material separating arm adapted to enter a groove formed in the outer periphery of said exposing drum so as to separate the leading end of said thermal developing photosensitve material from the outer periphery of said exposing drum.

16. An image recording apparatus in which an image is formed on a thermal developing photosensitive material by means of light exposure, developed thermally and transferred to an image-receiving paper so as to be recorded thereon, which comprises:
(a) photosensitive material feed means for feeding said thermal developing photosensitive material wound in the shape of a roll;

(b) an exposing drum retaining said fed thermal developing photosensitive material which is wound on the outer periphery thereof;

(c) an exposing head disposed so as to face the outer periphery of said exposing drum and adapted to form an image on said thermal developing photosensitive material wound on the outer periphery of said exposing drum by means of light exposure;

(d) thermal developing means for thermally developing said exposed photosensitive material which is still wound on the outer periphery of said exposing drum;

(e) image-receiving paper feed means for feeding said image-receiving paper onto said thermal developing photosensitive material wound on the outer periphery of said exposing drum;

(f) transfer means adapted to press both said thermal developing photosensitive material and said image-receiving paper against the outer periphery of said exposing drum, thereby transferring the image formed on said thermal developing photosensitive material to said image-receiving paper;

(g) image-receiving paper separating means disposed between said transfer means and said exposing head and adapted to separate said image-receiving paper having an image transferred thereto from the exposing drum; and (h) photosensitive material separating means disposed between said image-receiving paper separating means and said exposing head and adapted to separate said thermal developing photosensitive material from the outer periphery of said exposing drum, whereby it is possible to effect exposing, developing and transfer operations while keeping said thermal developing photosensitive material wound on the outer periphery of said exposing drum.

17. An image recording apparatus according to claim 16, wherein said thermal developing means includes a heater incorporated in said exposing drum for heating said thermal developing photosensitive material wound thereon.

18. An image recording apparatus according to claim 17, wherein said transfer means is defined by a plurality of rollers which press both said image-receiving paper and said thermal developing photosensitive material against the outer periphery of said exposing drum.

19. An image recording apparatus according to claim 18, wherein said exposing drum has a through-hole provided in the outer peripheral portion thereof, said thermal developing photosensitive material being kept wound on the outer periphery of said exposing drum by suction effected through said through-hole.

20. An image recording apparatus according to claim 19, wherein said exposing drum has a cut portion formed by partially cutting the outer periphery thereof in a direction tangential thereto, and clips respectively secured to two lateral ends thereof, the leading end portion of said thermal developing photosensitive material being clamped between the surface of said cut portion and said clips.

21. An image recording apparatus according to claim 20, wherein said cut portion is provided with a step for positioning the leading end portion of said thermal developing photosensitive material.

22. An image recording apparatus according to claim 18, wherein said transfer means has drive means adapted to move said plurality of rollers in a direction in which they press both said image-receiving paper and said thermal developing photosensitive material against the outer periphery of said exposing drum only when transfer is effected.

23. An image recording apparatus according to claim 16, wherein said image-receiving paper feed means includes an one-way roller for guiding said image-receiving paper to the outer periphery of said exposing drum.

* * * * *